(12) United States Patent
Zeilinger

(10) Patent No.: US 11,189,818 B1
(45) Date of Patent: Nov. 30, 2021

(54) ELECTROLYTE DISPENSING AND COATING SYSTEM

(71) Applicant: Apple Inc., Cupertino, CA (US)

(72) Inventor: Tobias Zeilinger, Palo Alto, CA (US)

( * ) Notice: Subject to any disclaimer, the term of this patent is extended or adjusted under 35 U.S.C. 154(b) by 477 days.

(21) Appl. No.: 16/038,874

(22) Filed: Jul. 18, 2018

Related U.S. Application Data

(60) Provisional application No. 62/549,074, filed on Aug. 23, 2017.

(51) Int. Cl.
| | | |
|---|---|---|
| *B32B 41/00* | (2006.01) | |
| *H01M 4/04* | (2006.01) | |
| *H01M 4/139* | (2010.01) | |
| *H01M 10/058* | (2010.01) | |
| *H01M 50/403* | (2021.01) | |
| *B32B 38/18* | (2006.01) | |
| *B32B 37/00* | (2006.01) | |

(52) U.S. Cl.
CPC ......... *H01M 4/0404* (2013.01); *H01M 4/139* (2013.01); *H01M 10/058* (2013.01); *H01M 50/403* (2021.01); *B32B 37/0053* (2013.01); *B32B 38/1808* (2013.01); *B32B 2307/204* (2013.01); *B32B 2457/10* (2013.01)

(58) Field of Classification Search
CPC ............ H01M 4/0404; H01M 50/403; H01M 10/058; H01M 4/139; B32B 2457/10; B32B 2307/204; B32B 37/0053; B32B 38/1808

USPC .................. 156/60, 64, 350, 351, 378, 379
See application file for complete search history.

(56) References Cited

U.S. PATENT DOCUMENTS

| | | | | |
|---|---|---|---|---|
| 2006/0257736 A1* | 11/2006 | Watanabe | ........... | H01M 10/052 |
| | | | | 429/209 |
| 2012/0219844 A1* | 8/2012 | Tsutsumi | .............. | H01M 4/136 |
| | | | | 429/153 |

* cited by examiner

*Primary Examiner* — Michael N Orlando
*Assistant Examiner* — Joshel Rivera
(74) *Attorney, Agent, or Firm* — Kilpatrick Townsend & Stock

(57) ABSTRACT

Electrolyte dispensing systems according to embodiments of the present technology may include a housing defining an internal volume. The housing may define an inlet and an outlet. The dispensing system may include an inlet roller positioned proximate the housing inlet. The inlet roller may be configured to provide a substantial seal at the housing inlet when a substrate is delivered into the housing. The dispensing system may include a delivery device positioned between the housing inlet and housing outlet. The delivery device may be configured to supply an electrolyte to the substrate delivered into the housing. The electrolyte dispensing system may also include an outlet roller positioned proximate the housing outlet. The outlet roller may be configured to provide a substantial seal at the housing outlet when the substrate is delivered from the housing.

20 Claims, 4 Drawing Sheets

ELECTROLYTE DISPENSING AND COATING SYSTEM

CROSS REFERENCE TO RELATED APPLICATION

This application claims the benefit of U.S. Application Ser. No. 62/549,074, filed Aug. 23, 2017, the entire disclosure of which is hereby incorporated by reference in its entirety for all purposes.

TECHNICAL FIELD

The present technology relates to battery manufacturing. More specifically, the present technology relates to methods and systems for battery formation.

BACKGROUND

Batteries may be formed by many processes. During fabrication of a variety of cells, an electrolyte is provided into the cell to promote ionic conductivity. As battery geometries continue to develop, conventional techniques for providing the electrolyte may increase fabrication time.

SUMMARY

Electrolyte dispensing systems according to embodiments of the present technology may include a housing defining an internal volume. The housing may define an inlet and an outlet. The dispensing system may include an inlet roller positioned proximate the housing inlet. The inlet roller may be configured to provide a substantial seal at the housing inlet when a substrate is delivered into the housing. The dispensing system may include a delivery device positioned between the housing inlet and housing outlet. The delivery device may be configured to supply an electrolyte to the substrate delivered into the housing. The electrolyte dispensing system may also include an outlet roller positioned proximate the housing outlet. The outlet roller may be configured to provide a substantial seal at the housing outlet when the substrate is delivered from the housing.

In some embodiments, the outlet roller is configured to provide a laminate material to the substrate as the substrate is delivered from the housing. The delivery device may be contained within the internal volume of the housing, or the housing may define an aperture in an upper surface of the housing through which the delivery device may extend. The housing may include sidewalls and a base extending about the substrate delivered through the housing. The internal volume defined by the housing may be formed to establish an electrolyte vapor pressure within the internal volume during operation. Exemplary systems may also include at least two internal rollers positioned within the housing between the inlet and the outlet. The internal rollers may be configured to form seals along a lateral edge of the substrate delivered through the housing. In some embodiments a tread extends across the internal rollers, and the tread may be configured to seal the lateral edge of the substrate delivered through the housing. The tread may include a masking bar extending normal to the tread. The delivery device may include a set of delivery devices to provide a multi-step application of electrolyte to the substrate delivered through the housing.

The present technology also encompasses additional electrolyte dispensing systems. The systems include a housing defining an internal volume, and the housing may define an inlet and an outlet. The systems may include an inlet roller positioned proximate the housing inlet, and configured to provide a substantial seal at the housing inlet when a substrate is delivered into the housing. The systems may include a first delivery device positioned between the housing inlet and housing outlet. The delivery device may be configured to supply an electrolyte to the substrate delivered into the housing. The systems may include an internal roller positioned within the housing between the first delivery device and the housing outlet. The internal roller may be configured to apply a separator to the substrate. The housing may define an aperture proximate the internal roller for receiving the separator. The systems may also include an outlet roller positioned proximate the housing outlet. The outlet roller may be configured to provide a substantial seal at the housing outlet when the substrate is delivered from the housing.

In some embodiments the system also includes a second delivery device positioned between the internal roller and the housing outlet. The second delivery device may be configured to supply additional electrolyte to the substrate delivered into the housing. The outlet roller may be configured to provide a laminate material to the substrate as the substrate is delivered from the housing. The delivery device may be contained within the internal volume of the housing. The housing may define an aperture in an upper surface of the housing, and the delivery device may extend through the aperture. The internal volume defined by the housing may be formed to establish an electrolyte vapor pressure within the internal volume during operation. The systems may also include at least two sealing rollers positioned within the housing between the inlet and the outlet. The sealing rollers may be configured to form seals along a lateral edge of the substrate delivered through the housing. In some embodiments, the first delivery device is an inkjet distributor positioned within the housing to deliver electrolyte towards a central portion of the substrate.

The present technology also encompasses methods of applying electrolyte to a cell. The methods may include delivering a battery cell webbing into an internal volume of a housing positioned along a roller assembly. The methods may include applying an electrolyte to the battery cell webbing. The electrolyte may be applied within the internal volume of the housing, and a vapor pressure of the electrolyte may be maintained within the internal volume of the housing. The methods may include delivering the battery cell webbing from the internal volume of the housing. The methods may also include applying a laminate to the battery cell webbing proximate an outlet of the internal volume. In some embodiments, an inlet to the housing is substantially sealed by a compliant roller that delivers the battery cell webbing into the internal volume of the housing.

Such technology may provide numerous benefits over conventional technology. For example, the present systems may limit electrolyte component and solvent losses during manufacturing operations. Additionally, the present systems may increase the types of electrolytes that may be used with battery cell systems according to some embodiments of the present technology. These and other embodiments, along with many of their advantages and features, are described in more detail in conjunction with the below description and attached figures.

BRIEF DESCRIPTION OF THE DRAWINGS

A further understanding of the nature and advantages of the disclosed embodiments may be realized by reference to the remaining portions of the specification and the drawings.

Figure 1:
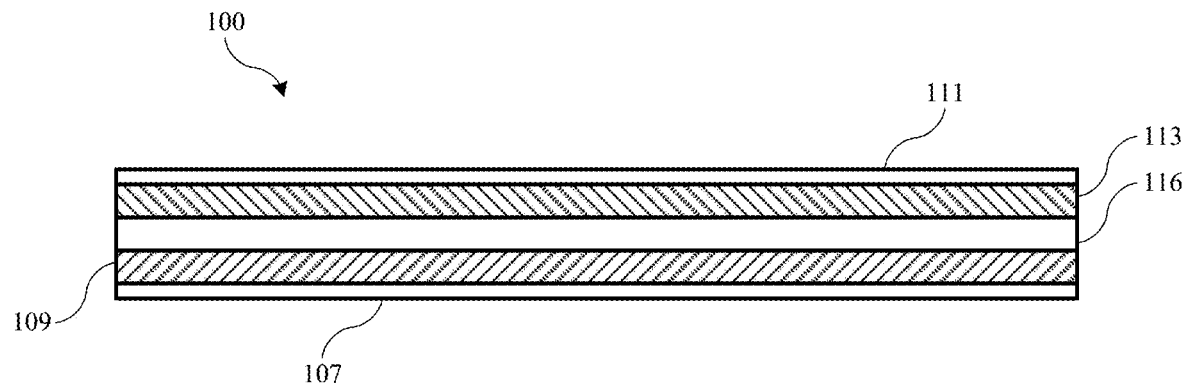
FIG. 1 shows a cross-sectional view of an energy storage device according to embodiments of the present technology.

Several of the figures are included as schematics. It is to be understood that the figures are for illustrative purposes, and are not to be considered of scale unless specifically stated to be of scale. Additionally, as schematics, the figures are provided to aid comprehension and may not include all aspects or information compared to realistic representations, and may include exaggerated material for illustrative purposes.

In the figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

Batteries, battery cells, and more generally energy storage devices, may be made from a host of materials, and in a variety of configurations. For example, battery cells may be rolled, layered, or stacked, and may also be formed in single layer designs. Batteries having a large form factor may include one or more layers of battery cells, each characterized by the outer dimensions of the battery housing. These batteries may also include wound or overlapped sections, which may be a single set of cell components.

Electrolytes used in some batteries may include volatile materials or solvents. The electrolytes are often delivered into a cell near the end of the fabrication process to limit time for solvents or other materials to evaporate from the cell. A balance of salt and solvents within the electrolyte can define the conductivity and overall performance of the battery. For example, a conventional cell formation technique includes providing a liquid electrolyte after the cell has been formed and inserted within a pouch or enclosure. Before the pouch is completely sealed, such as when one section remains open, the electrolyte is injected into the pouch. For battery cells having a small form factor, this technique may be sufficient for delivering the electrolyte, which may diffuse through the electrode materials to saturate the cell.

For battery cells characterized by larger lateral dimensions, such as tens of centimeters, or meters, these conventional techniques may be inefficient and may be susceptible to distribution of electrolyte that is not uniform through the cell. Some electrolytes may be relatively viscous materials, and so diffusion through an electrode material may not occur instantaneously. The larger the lateral dimension for diffusion, the longer time period required. Moreover, diffusion may occur slower than delivery, and thus delivery may require multiple injection operations. Heating the cell components may also be performed to facilitate the diffusion. Regardless, these techniques may not provide adequate assurance of uniform distribution through the cell.

Conventional technology has attempted to address these issues by either adjusting manufacturing to account for these increased distribution times, or utilizing different electrolytes that do not include volatile components. As noted above, however, accounting for the excess distribution time may not be sufficient to ensure uniform distribution. Additionally, utilizing different electrolyte components may reduce performance or capacity of the produced battery.

The present technology overcomes these issues by utilizing advanced manufacturing techniques that account for the volatility of components of the electrolyte. By creating a substantially closed system during electrolyte delivery, evaporation during application of the electrolyte can be limited. Additionally, by performing lamination of the cell subsequent the electrolyte delivery, evaporation can be reduced or eliminated from downstream processes.

Although the remaining portions of the description will routinely reference lithium-ion batteries, it will be readily understood by the skilled artisan that the technology is not so limited. The present techniques may be employed with any number of battery or energy storage devices, including other rechargeable and primary, or non-rechargeable, battery types, as well as electrochemical capacitors also known as supercapacitors or ultracapacitors. Moreover, the present technology may be applicable to batteries and energy storage devices used in any number of technologies that may include, without limitation, phones and mobile devices, handheld electronic devices, laptops and other computers, appliances, heavy machinery, transportation equipment including automobiles, water-faring vessels, air travel equipment, and space travel equipment, as well as any other device that may use batteries or benefit from the discussed designs. Accordingly, the disclosure and claims are not to be considered limited to any particular example discussed, but can be utilized broadly with any number of devices that may exhibit some or all of the electrical or chemical characteristics of the discussed examples.

FIG. 1 depicts a schematic cross-sectional view of an energy storage device 100 according to embodiments of the present technology. The energy storage device may include a single current collector or coupled current collectors, such as with repeated layers of the materials illustrated. The energy storage device may operate in a conventional manner with regard to electronic flow across or through material layers, such as providing electronic mobility across an xy-plane of the current collectors. Additionally, the described devices may operate by electronic flow through the structure in a z-direction through individual cells as opposed to via tabbed current collectors as used by some conventional batteries. As would be readily understood, the layers are not shown at any particular scale, and are intended merely to show the possible layers of cell material 100.

In some embodiments, as shown in FIG. 1, stacked cell 100 includes a first current collector 107 and a second current collector 111. In embodiments one or both of the current collectors may include a metal or a non-metal material, such as a polymer or composite. The first current collector 107 and second current collector 111 may be different materials in embodiments. For example, in some embodiments the first current collector 107 may be a material selected based on the potential of an anode active material 109, such as copper, stainless steel, or any other suitable metal, as well as a non-metal material including a polymer. The second current collector 111 may be a material selected based on the potential of a cathode active material 113, such as aluminum, stainless steel, or other suitable metals, as well as a non-metal material including a polymer. In other words, the materials for the first and second current collectors can be selected based on electrochemical compatibility with the anode and cathode active materials used.

The first and second current collectors can be made of any material known in the art. For example, copper, aluminum, nickel, or stainless steel may be used, as well as composite materials having metallic aspects, and non-metallic materials including polymers. In some instances the metals or non-metals used in the first and second current collector can be the same or different. The materials selected for the anode and cathode active materials can be any suitable battery materials. For example, the anode active material 109 can be silicon, graphite, carbon, a tin alloy, lithium metal, a lithium containing material, such as lithium titanium oxide (LTO), or other suitable materials that can form an anode in a battery cell. Additionally, for example, the cathode active material 113 can be a lithium-containing material. In some embodiments, the lithium-containing material can be a lithium metal oxide, such as lithium cobalt oxide, lithium manganese oxide, lithium nickel manganese cobalt oxide, lithium nickel cobalt aluminum oxide, or lithium titanate, while in other embodiments, the lithium-containing material can be a lithium iron phosphate, or other suitable materials that can form a cathode in a battery cell.

The first and second current collectors as well as the active materials may have any suitable thickness, and may have a thickness that allows a seal to be formed about an exterior of the components and provides suitable mechanical stability to prevent failure, such as breakage of the layers, during anticipated installation or usage of the battery. Additionally, the thickness of the current collectors can be sufficiently thin to allow for bending and flexing in a region that may extend beyond the active materials to accommodate expansion anticipated during cycling of the battery cell, including expansion in the z-direction. A separator 116 may be disposed between the electrodes, and may be a polymer film or a material that may allow lithium ions to pass through its structure while not otherwise conducting electricity.

Active materials 109 and 113 may additionally include an amount of electrolyte in a completed cell configuration. The electrolyte may be a liquid including one or more salt compounds that have been dissolved in one or more solvents. The salt compounds may include lithium-containing salt compounds in embodiments, and may include one or more lithium salts including, for example, lithium compounds incorporating one or more halogen elements such as fluorine or chlorine, as well as other non-metal elements such as phosphorus, and semimetal elements including boron, for example. In embodiments, the salts may include any lithium-containing material that may be soluble in organic solvents. The solvents included with the lithium-containing salt may be organic solvents, and may include one or more carbonates. For example, the solvents may include one or more carbonates including propylene carbonate, ethylene carbonate, ethyl methyl carbonate, dimethyl carbonate, diethyl carbonate, and fluoroethylene carbonate. Combinations of solvents may be included, and may include for example, propylene carbonate and ethyl methyl carbonate as an exemplary combination. Any other solvent may be included that may enable dissolving the lithium-containing salt or salts as well as other electrolyte component, for example, or may provide useful ionic conductivities, such as greater than or about 5-10 mS/cm.

Although illustrated as single layers of electrode material, cell material 100 may be any number of layers. Although the cell may be composed of one layer each of anode and cathode material as sheets, the layers may also be formed into a jelly roll design, or folded design, such that any number of layers may be included in cell material 100. For embodiments which include multiple layers, tab portions of each anode current collector may be coupled together, as may be tab portions of each cathode current collector, when tab portions are used for xy-distribution of current.

FIG. 1 illustrates an exemplary stacked battery design according to some embodiments of the present technology. Additional configurations other than illustrated, or as variations on the designs, are also encompassed by the present technology. For example, certain embodiments may include current collector designs including combinations of polymer material and conductive materials, such as within a matrix. Battery cells according to the present technology may be formed to any size as may be useful in specific applications. Additionally, battery cells according to some embodiments of the present technology may be characterized by at least one lateral dimension greater than or about half a meter, or greater than or about one meter, and may include cells including orthogonal lateral dimensions each greater than or about half a meter, or greater than or about one meter. Formation of battery cells having these dimensions may cause manufacturing difficulty as previously explained. The following assembly systems and techniques may facilitate forming battery cells according to some embodiments of the present technology.

Figure 2:
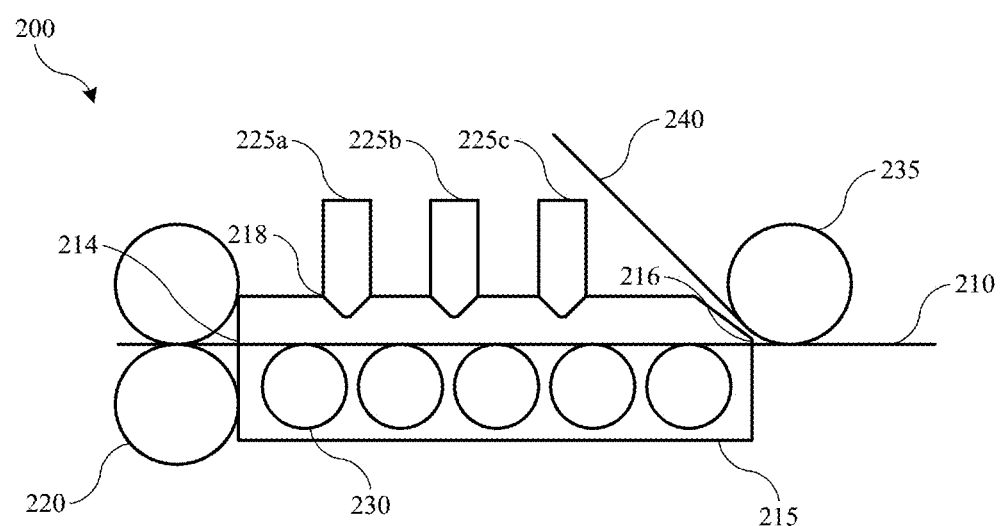
FIG. 2 shows a schematic cross-sectional view of an electrolyte dispensing system according to embodiments of the present technology.

FIG. 2 shows a schematic cross-sectional view of an electrolyte dispensing system 200 according to embodiments of the present technology. System 200 may be part of an inline process for forming one or more battery cells, and may illustrate one section of a process system, or may illustrate one system that operates with additional manufacturing lines. For example, upstream processes may include depositing electrode active materials on current collectors. These processes may occur upstream of system 200 along a single line, or may be performed on separate lines to produce spools, sheets, or other electrodes for use in system 200 to form a battery cell, or layers of material that will be used within a battery cell.

In some embodiments, such as illustrated, system 200 includes a portion of an inline system for administering electrolyte to a substrate 210 that may be delivered to and from system 200. Substrate 210 may include one or more materials that may be included within a battery cell. For example, substrate 210 may include a current collector having an electrode material disposed on a top surface, and in other embodiments substrate 210 may include a web having multiple layers of a battery cell, such as each of the layers of energy storage device 100 previously described, as well as a portion of a pouch or enclosure that may be used to seal the battery cell subsequent delivery of the electrolyte. As noted previously, electrolytes according to some embodiments of the present technology may be volatile, and system 200 may deliver the electrolytes prior to, including directly prior to, sealing a battery cell.

Due to the volatile nature of solvents or other components of electrolytes that may be used in the present technology, system 200 may include a housing 215 about a section of the inline system. Housing 215 may define an internal volume through which substrate 210 may pass to receive an electrolyte. The housing 215 may define an inlet 214 at one end of the housing, and may define an outlet 216 at a second end of the housing opposite the first. One or more inlet rollers 220 may be positioned proximate the housing inlet 214. For example, as illustrated, two inlet rollers 220 are included, with the inlet rollers disposed above and below the substrate being delivered into the housing 215. However, other configurations are encompassed by the present technology including an assembly roller stand and rollers that may support substrate 210 from below while a single inlet roller 220 is used above the substrate 210.

The rollers 220 may be positioned and configured to provide a substantial seal at the housing inlet 214. The seal may also be formed based on the delivery of the substrate 210, which may be disposed in a gap between the two inlet rollers 220 in embodiments. In some embodiments, the seal may not be completely liquid tight, hermetic, or otherwise a full seal, although by substantial is meant that the seal formed limits egress of gaseous materials from inlet 214 during operation. For example, while removing inlet roller 220 from the system may provide direct access to inlet 214, inlet roller 220 may limit gas egress from the inlet by greater than or about 25% over an open access, and may limit gas egress from the inlet by greater than or about 30%, greater than or about 40%, greater than or about 50%, greater than or about 60%, greater than or about 70%, greater than or about 80%, greater than or about 90%, or about 100% in which a full gas seal may be developed at inlet 214. Accordingly, in some embodiments of the present technology, inlet roller 220 may partially, substantially, or essentially seal housing 215 at inlet 214.

Inlet rollers 220 may be formed of any number of materials including metal, such as galvanized rollers, plastics that may be inert to materials disposed on the substrate, or any other materials that may be useful for both delivering the substrate into the housing and/or forming a seal with housing 215. For example, in some embodiments, inlet rollers 220 are compliant rollers. While some roller materials used to form a seal may compress or spread materials disposed on the substrate 210, compliant rollers may have a degree of compressibility or flex allowing formation of a seal with housing 215 while limiting an impact, such as a compressive impact, on materials disposed on substrate 210. In some embodiments, inlet rollers 220 have no impact on materials disposed on substrate 210 while providing a substantial seal with housing 215.

Positioned between inlet 214 and outlet 216 of housing 215 may be one or more delivery devices 225. FIG. 2 illustrates three delivery devices 225a, 225b, and 225c, although in other embodiments more or fewer delivery devices may be included within system 200. Delivery devices 225 may be configured to supply an electrolyte to substrate 210 as the substrate is delivered through housing 215. Delivery devices 225 may be provided at any location between inlet 214 and outlet 216 in embodiments. Additionally, one or more delivery devices 225 may be disposed laterally from one another to accommodate additional lateral surface area of substrate 210. For example, in some embodiments substrate 210 is characterized by a lateral dimension greater than one meter. Accordingly, multiple delivery devices 225 may be disposed across system 200 to deliver additional electrolyte to or towards central and lateral regions of the substrate. Heat may be applied in some embodiments to facilitate distribution and/or reduce viscosity of electrolyte materials. The heat may be applied at any location, including by a heater positioned along or incorporated with housing 215. In some embodiments, delivery device 225 may be positioned towards inlet 214, such as with delivery device 225a, to allow additional residence time within housing 215, which may allow additional incorporation within, for example, electrode active material prior to delivery from housing 215.

The present technology may utilize one or more types of delivery devices for application of electrolyte within system 200. For example, in some embodiments, delivery device 225 may be or include one or more of a spray nozzle, slot die, a pressurized applicator, a gravure coater, an inkjet printer, or any other applicator that may provide adequate coverage, patterning, or loading of electrolyte materials to substrate 210. For example, electrolytes according to some embodiments of the present technology may be characterized by a viscosity at about 20° C. of greater than or about 0.2 cP, and may be characterized by a viscosity at about 20° C. of greater than or about 0.4 cP, greater than or about 0.6 cP, greater than or about 0.8 cP, greater than or about 1.0 cP, greater than or about 1.2 cP, greater than or about 1.4 cP, greater than or about 1.6 cP, greater than or about 1.8 cP, greater than or about 2.0 cP, or greater in embodiments. Delivery devices and techniques may be utilized to account for the particular viscosity in view of the temperature at which application may occur in embodiments.

Additionally, the delivery device may be selected to afford a loading of electrolyte as the substrate travels through the housing 215. For example, delivery device or devices 225 may provide a loading of electrolyte of greater than or about 10 g/m$^2$, and in some embodiments the loading of electrolyte may be greater than or about 15 g/m$^2$, greater than or about 20 g/m$^2$, greater than or about 25 g/m$^2$, greater than or about 30 g/m$^2$, greater than or about 35 g/m$^2$, greater than or about 40 g/m$^2$, greater than or about 45 g/m$^2$, greater than or about 50 g/m$^2$, greater than or about 55 g/m$^2$, greater than or about 60 g/m$^2$, greater than or about 65 g/m$^2$, greater than or about 70 g/m$^2$, greater than or about 75 g/m$^2$, greater than or about 80 g/m$^2$, or greater. The amount of electrolyte may depend on characteristics including the number of layers of the substrate, which may be a web including multiple cell layers, the thickness of the electrode active materials, or other variables relating to an amount of electrolyte used in a battery cell. The loading may be provided by a single delivery device 225, and may be divided among several delivery devices 225 included with system 200.

As previously noted, electrolytes according to some embodiments of the present technology may include solvents or other materials that are volatile at delivery or manufacturing temperatures. In some embodiments system 200 may be cooled, or may be maintained in a cooled environment to reduce evaporation of solvent or other materials, although in embodiments reducing the temperature may increase viscosity of electrolyte materials above 3 cP, above 4 cP or greater, which may affect incorporation, distribution, or delivery of the electrolyte materials depending on the delivery device, substrate rate through system 200, and other common factors in assembly line manufacturing. System 200 may also be utilized to reduce evaporation by maintaining a vapor pressure of electrolyte materials or solvents within housing 215.

Housing 215 may be formed to provide a partially or substantially closed system during application of the electrolyte materials. By limiting gas phase exchange from the housing, a vapor/fluid balance may be established with the electrolyte materials. Assembly manufacturing may often be performed by systems having partial or full exposure to environmental conditions. When volatile components, such as solvents, are utilized in open environments, the materials may evaporate into the surrounding environment. For example, when exposed to standard atmosphere, several of the exemplary solvents noted above will dissipate to the surrounding environment. Conventional injection technology may limit this evaporation by performing the injection into a substantially closed pouch or battery cell, where conventional techniques performing assembly line production may be incapable of using such electrolytes.

Some embodiments of the present technology overcome these issues by performing the electrolyte delivery within the internal volume of housing 215, which may allow a vapor pressure to be established. Although an amount of vapor egress may occur, evaporation may be controlled by the provided vapor pressure, which may approach equilibrium depending on an extent to which the housing may be sealed. The vapor pressure may be less than a surrounding environmental atmospheric pressure in embodiments, but may otherwise be maintained sufficiently high to contain volatile solvents within the electrolyte materials. In embodiments, the vapor pressure may be maintained above or about 20 kPa, and may be maintained above or about 30 kPa, above or about 40 kPa, above or about 50 kPa, above or about 60 kPa, above or about 70 kPa, above or about 80 kPa, above or about 90 kPa, above or about 100 kPa, or higher depending on an environmental pressure beyond housing 215. In embodiments the vapor pressure may be maintained at least about 10 kPa below an environmental pressure.

Controlling the vapor pressure may be facilitated by limiting the internal volume within which a vapor balance is established. As illustrated in FIG. 2, in some embodiments housing 215 may be extended about substrate 210 and associated equipment for delivery of the electrolyte and movement of the line. For example, housing 215 may include sidewalls and a base that extends about the substrate and any assembly line materials. For example, in some embodiments additional rollers 230 are included below substrate 210 to provide structural support as well as translation through housing 215. Additional rollers 230 may be enclosed within housing 215 in embodiments. To control the internal volume, housing 215 may define one or more apertures 218 in an upper surface of the housing above a surface of the substrate 210 to which electrolyte is to be applied. Delivery devices 225 may extend within apertures 218, such as with a nozzle or applicator, to provide the electrolyte without requiring the housing to extend about the full delivery device. Accordingly, a reduced internal volume may be maintained with system 200 to develop an electrolyte material vapor pressure soon after the process has begun.

System 200 may also include an outlet roller 235 in embodiments. As illustrated, outlet roller 235 is positioned proximate housing outlet 216. Although illustrated with a single outlet roller, system 200 may include an additional outlet roller beneath the substrate, as with inlet rollers 220. Similar to inlet rollers 220 as discussed above, outlet rollers 235 may be configured to provide a substantial seal at the housing outlet when the substrate 210 is delivered from the housing 215. Outlet rollers 235 may be compliant rollers and may be formed of the same materials as inlet rollers 220. In some embodiments outlet rollers 235 may be formed of a different material than inlet rollers 220, and the different material may be compatible with materials included in the electrolyte applied in housing 215. For example, any materials that may be reactive or may be characterized by a tacky consistency may be accommodated by outlet roller 235 based on a smooth or treated surface configured to limit interaction with electrolyte materials or other materials on the substrate 210.

Outlet roller 235 may additionally provide or apply a laminate material 240 to substrate 210 as the substrate is delivered from the housing 215. As the substrate exits the housing 215, the electrolyte may no longer be exposed to an environment with high vapor pressure. If left untreated, solvents or other electrolytic materials may evaporate or dissipate from the substrate. System 200 may limit or prevent this loss by applying a laminate material upon exit from the housing, such as directly upon exiting the housing. Outlet roller 235 may be shaped or operated to apply the laminate along the substrate, such as by forming the lamination along sides of the laminate material 240. For example, outlet roller 235 may include heat or compression rollers at distal locations from a center of outlet roller 235, or system 200 may include additional components for forming the lamination. The laminate material 240 may be any number of components that may be permanently or removably coupled with substrate 210. In some embodiments, such as illustrated, housing 215 is characterized by an outlet configuration that accommodates application of the laminate material 240 proximate or adjacent outlet 216. For example, housing 215 may be characterized by a sloped, chamfered, beveled, or other profile that provides access for laminate material 240 to be applied near or directly at outlet 216.

In some embodiments, laminate material 240 may be or include a battery cell seal, such as an outer pouch or material enclosing the cell components. Laminate material 240 may itself be or include one or more battery cell components, such as a separator material for a battery cell. In some battery designs, the separator may fully cover underlying or contacted electrode materials, and include a region of overhang, which, in some embodiments, may be used to seal delivered electrolyte materials as substrate 210 exits housing 215. In still other embodiments, a removable seal may be applied for coverage in cell fabrication in which a complete cell may be formed in subsequent operations. For example, laminate material 240 may include a covering material that may provide a vapor barrier to electrolyte or other cell materials, and may ensure that delivered materials are maintained on the substrate 210 for subsequent cell development.

Figure 3:
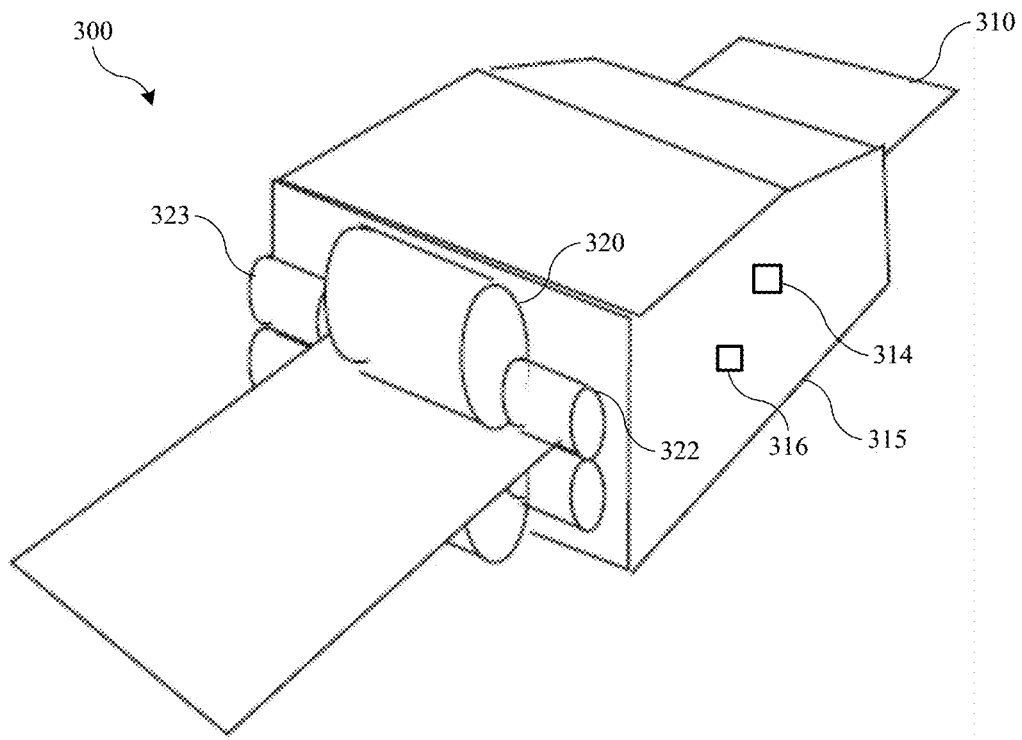
FIG. 3 shows a schematic perspective view of an electrolyte dispensing system according to embodiments of the present technology.

Turning to FIG. 3 is shown a schematic perspective view of another electrolyte dispensing system 300 according to embodiments of the present technology. System 300 may include some or all components or characteristics of electrolyte dispending system 200 described above. For example, system 300 includes a housing 315 defining an internal volume through which a substrate 310 may be delivered. An electrolyte material may be applied to substrate 310 within housing 315 as previously described. Housing 315 may be formed to accommodate electrolyte delivery devices within the internal volume as discussed below. System 300 may also include one or more inlet rollers 320 to provide a sealing capability as previously described, where inlet roller 320 may be a compliant roller.

Along with inlet rollers 320 may be a set of sealing rollers 322, 323, for example, which may seal edge regions of substrate 310. In embodiments, substrate 310 may include materials external to the active materials of the electrodes, including current collectors, or pouch or encapsulation materials, for example. In some embodiments system 300 may be configured to limit or prevent application of electrolyte material along these exterior regions of substrate 310. For example, delivery devices may be positioned to supply electrolyte within a central region of substrate 310, which may limit application on edge regions. Additionally, sealing rollers 322, 323 may be used to limit or prevent electrolyte material from flowing into edge regions of the substrate. Sealing rollers 322, 323 may be included outside of housing 315, and may also be included within housing 315, such as with additional components discussed below.

FIG. 3 additionally includes aspects that may be incorporated with systems according to the present technology. For example, one or more ports or devices may be included to provide or maintain an environment within housing 315. Sensor 314 may include a pressure transducer or other measurement device that identifies or signals a particular pressure measurement within the housing 315. Sensor 314 may allow a particular vapor pressure of electrolyte to be developed within housing 314, and may allow additional control by providing feedback regarding pressure characteristics within the housing 315. Additionally, inlet port 316 may allow delivery of an inert or environmentally compatible gas into housing 315. For example, nitrogen, air, or any other gas or fluid may be delivered into housing 315 to protect the environment within housing 315. A fluid may be delivered through inlet port 316 to create a positive pressure within housing 315 to ensure a controlled environment where only the delivered fluid and electrolyte vapor may be present within the housing 315. Along with sensor 314, control over the electrolyte vapor pressure may be afforded within the system by controlling the amount and rate of inert gas delivery through inlet port 316.

Figure 4:
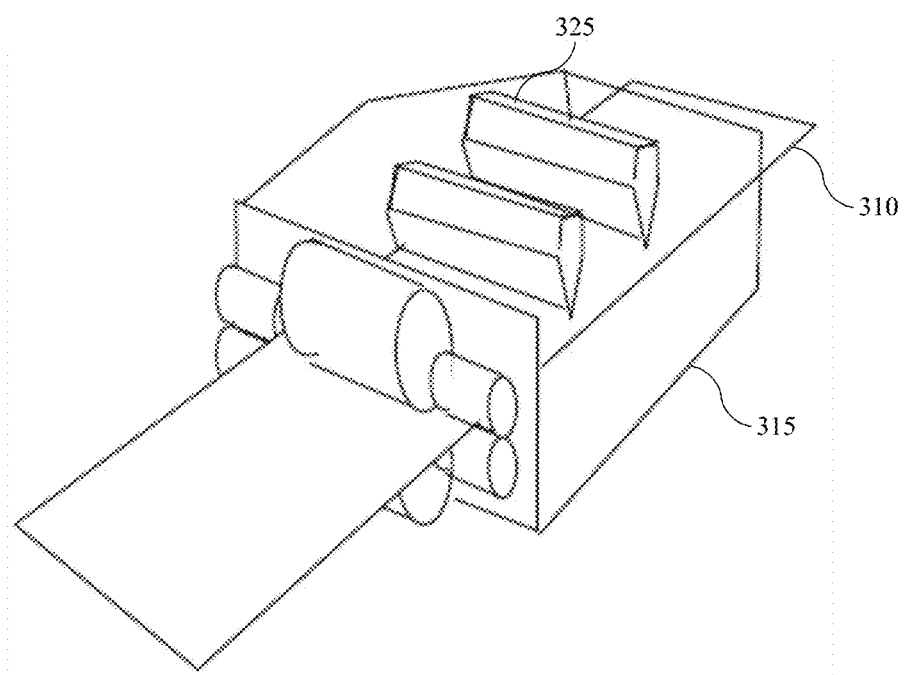
FIG. 4 shows a schematic perspective view of an electrolyte dispensing system according to embodiments of the present technology.

FIG. 4 shows a schematic perspective view of electrolyte dispensing system 300 according to embodiments of the present technology. FIG. 4 illustrates a hidden view through housing 315 to illustrate delivery devices 325. Delivery devices 325 may include any of the previously discussed applicators, which may be incorporated within the housing 315 and positioned to apply electrolyte to an exposed surface of substrate 310. Any number of delivery devices may be included to provide the loading of electrolyte and distribution to optimize application, absorption, and retention of electrolyte. Although a single delivery device 325 may be included within system 300, in some embodiments system 300 includes a set of delivery devices 325 to provide a multi-step application of electrolyte to substrate 310 as it is delivered through housing 315. Delivery devices 325 may include supply hosing, electrical connections, and other extensions that may pass through housing 315 through one or more apertures. Housing 315 may include gaskets or seals to limit airways through housing 315 to enable an electrolyte vapor pressure to be established as previously discussed. The gaskets may be formed from compatible materials, which may be specifically designed to be resistant to electrolyte or solvent vapors that contact the seals.

Figure 5:
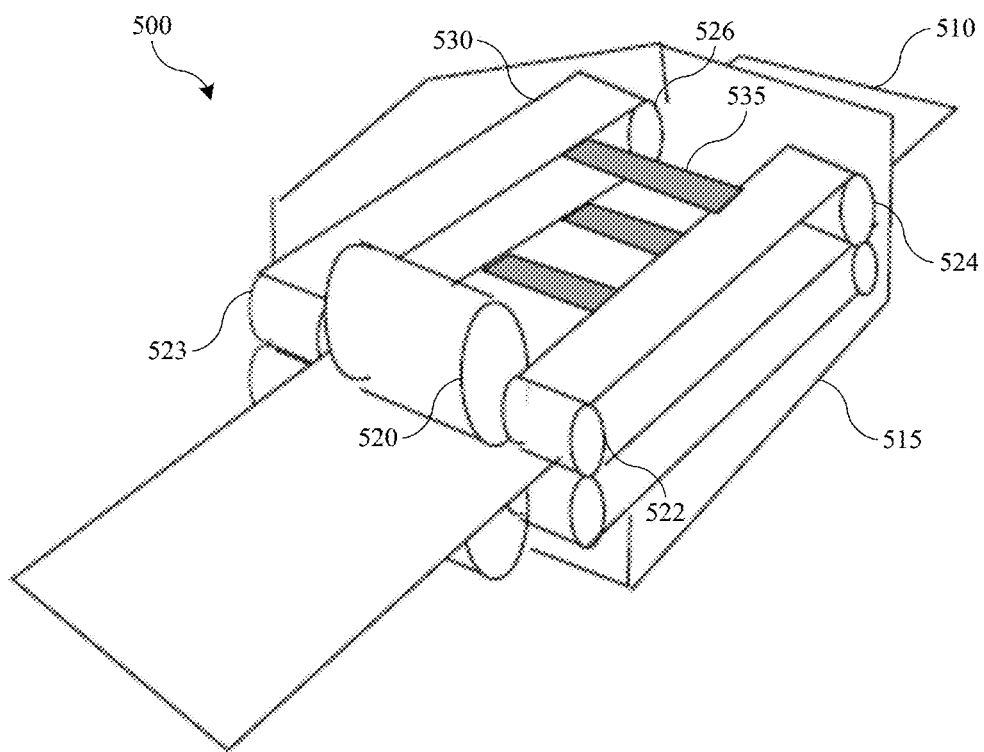
FIG. 5 shows a schematic perspective view of an electrolyte dispensing system according to embodiments of the present technology.

FIG. 5 shows a schematic perspective view of an electrolyte dispensing system 500 according to embodiments of the present technology. System 500 may include any of the components previously described with any of the other exemplary dispensing systems encompassed by the present technology. For example, system 500 includes a housing 515 defining an internal volume through which a substrate 510 may be delivered. An electrolyte material may be applied to substrate 510 within housing 515 as previously described. Housing 515 may be formed to accommodate electrolyte delivery devices within the internal volume as discussed previously. System 500 may also include one or more inlet rollers 520 to provide a sealing capability as previously described. In some embodiments, inlet roller 520 may be a compliant roller configured to form a substantial seal with housing 515, while limiting an impact on substrate 510.

System 500 may include sealing rollers 522, 523, which may be similar to sealing rollers 322, 323 previously described. Sealing rollers 522, 523 may be included with the system to form a seal along edge regions of substrate 510 throughout an internal volume of housing 515. In some embodiments, as illustrated, sealing rollers 522, 523 are positioned external to housing 515. Internal rollers 524, 526 may be positioned within housing 515 between an inlet and outlet of housing 515. The internal rollers may also form seals along lateral edges of substrate 510 delivered through housing 515, and may extend a seal formed by sealing rollers 522, 523. In some embodiments, a number of internal rollers may be included adjacent one another to form a seal extending across and throughout housing 515 along an external region of substrate 510. In some embodiments, such as illustrated, a tread 530 or some type of belt or track extends across two or more sets of rollers to provide a sealing function throughout housing 515.

Tread 530 may extend from sealing rollers 522, 523 and across inlet rollers 524, 526, and may seal a lateral edge of the substrate 510 through housing 515. Tread 530 may extend across multiple sets of inlet rollers, or may extend through housing 515 to access sealing rollers 522, 523. Any of a variety of configurations are also to be understood to be encompassed by embodiments of the present technology, although in some embodiments tread 530 may be maintained along rollers contained within housing 515 to limit electrolyte materials from flowing out from housing 515. For example, when tread 530 extends through housing 515, electrolyte materials along the tread may be exposed to an environmental atmosphere that may allow evaporation of solvents or other materials, which may affect a vapor balance in the internal volume of housing 515 as the tread returns through the housing.

Tread 530 may be formed of a number of materials, and in embodiments may be formed to limit interaction with materials on substrate 510. Tread 530 may also be formed of a material that may not react with electrolyte materials delivered within housing 515. In some embodiments a masking bar 535 extends across tread 530 to provide a block at designated locations along substrate 510 as it travels through housing 515. Masking bar 535 may extend normal to a travel direction of tread 530, and may provide a block to application of electrolyte material, or may provide a sensing mechanism to delivery devices to halt application of electrolyte over masking bar 535. In some embodiments, substrate 510 may be used to form a number of battery cells, which may be diced subsequent fabrication. Masking bar 535, along with other components of system 500, may be positioned or directed to protect regions between adjacent cell structures to facilitate separation at edge regions between cells. In some embodiments, masking bar 535 may continue on a return path of tread 530, which may extend above or around delivery devices to prevent additional blocking on the return path.

Figure 6:
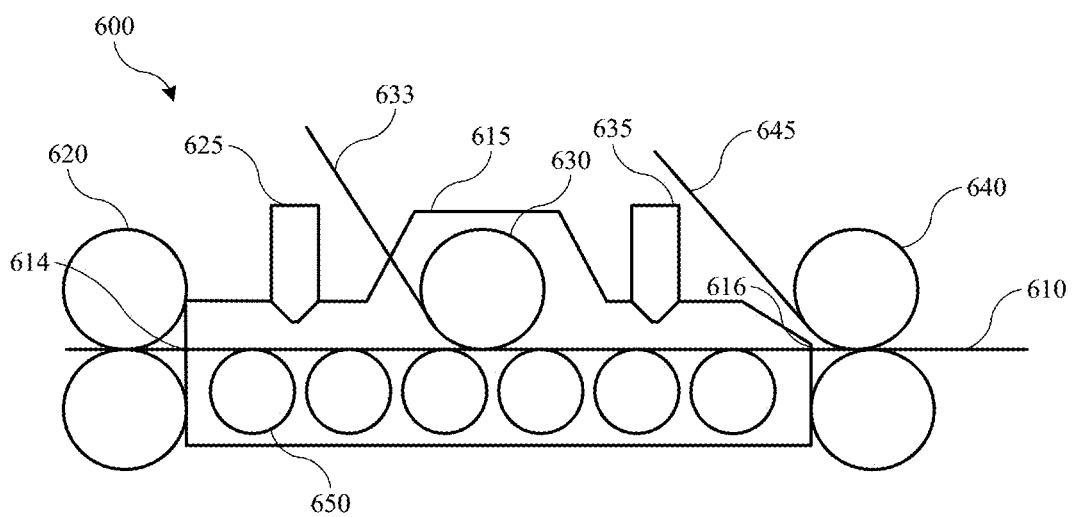
FIG. 6 shows a schematic cross-sectional view of an electrolyte dispensing system according to embodiments of the present technology.

Turning to FIG. 6 is shown a schematic cross-sectional view of an electrolyte dispensing system 600 according to embodiments of the present technology. System 600 may include any of the components discussed with respect to any of the other systems described according to embodiments of the present technology, including sealing rollers or systems discussed previously. System 600 may include a housing 615 defining an internal volume, which may be accessible from inlet 614. A substrate 610 may travel through housing 615 and may have operations performed upon it before exiting housing 615 at outlet 616. System 600 may include an inlet roller 620 positioned proximate the housing inlet 614. Inlet roller 620 may be positioned or configured to form a substantial seal at inlet 614 as previously described. In some embodiments, support rollers 650 may be included to aid delivery of substrate 610 through housing 615.

System 600 may differ in some aspects from other described systems by accommodating development of cells that may allow additional application of electrolyte materials, such as supplying electrolyte to multiple layers of a cell being formed. System 600 may include a first delivery device 625 positioned between the housing inlet 614 and the housing outlet 616. Delivery device 625 may be any of the delivery devices previously discussed, or any other applicator that may be configured to supply an electrolyte material to substrate 610. Similarly to other described systems, housing 615 may allow development of a vapor pressure of electrolyte components, such as solvents.

An internal roller 630 may be positioned within the housing 615 between the first delivery device 625 and the housing outlet 616. The internal roller may be enclosed within housing 615, and may be configured to apply a first material 633 to substrate 610. The first material may include one or more components, including a web of materials, and may include a battery separator, as well as a separator and electrode material combination. First material 633 may be supplied through housing 615 through an aperture in a ceiling or upper wall of the housing, which may be positioned proximate internal roller 630. First material 633 may be applied to aid incorporation of electrolyte supplied from first delivery device 625, and internal roller 630 may or may not apply an amount of pressure to compress the first material. For example, because first material 633 may be applied within the controlled environment of housing 615, the first material 633 may not be required to seal electrolyte material applied upstream.

System 600 may include additional aspects not shown, but which may be understood to be encompassed with the system. For example, in some embodiments first material 633 is a separator applied over a first electrode material and electrolyte on substrate 610. Additional application devices may be included in system 600 that may apply additional materials onto substrate 610. For example, a second electrode material may be applied above the separator with an additional delivery section of system 600 included within housing 615.

System 600 may include a second delivery device 635 positioned between the internal roller 630 and the housing outlet 616. The second delivery device 635 may supply an additional amount of electrolyte to substrate 610. For example, when additional electrode materials are formed over the substrate in system 600, having two electrolyte application positions may allow more uniform delivery and incorporation of electrolyte within cells formed through system 600. Delivery devices 625 and 635 may be included within housing 615 in some embodiments, and may also be positioned to provide electrolyte through apertures within housing 615 as previously described. One or more outlet rollers 640 may be positioned proximate housing outlet 616. The outlet roller 640 may provide a substantial seal at outlet 616 during delivery of substrate 610 from housing 615 to facilitate formation of a vapor equilibrium within housing 615. Outlet roller 640 may apply a laminate material 645 to substrate 610 as it exits housing 615. By applying a laminate directly at outlet 616, evaporation of electrolyte materials may be further limited or prevented.

Figure 7:
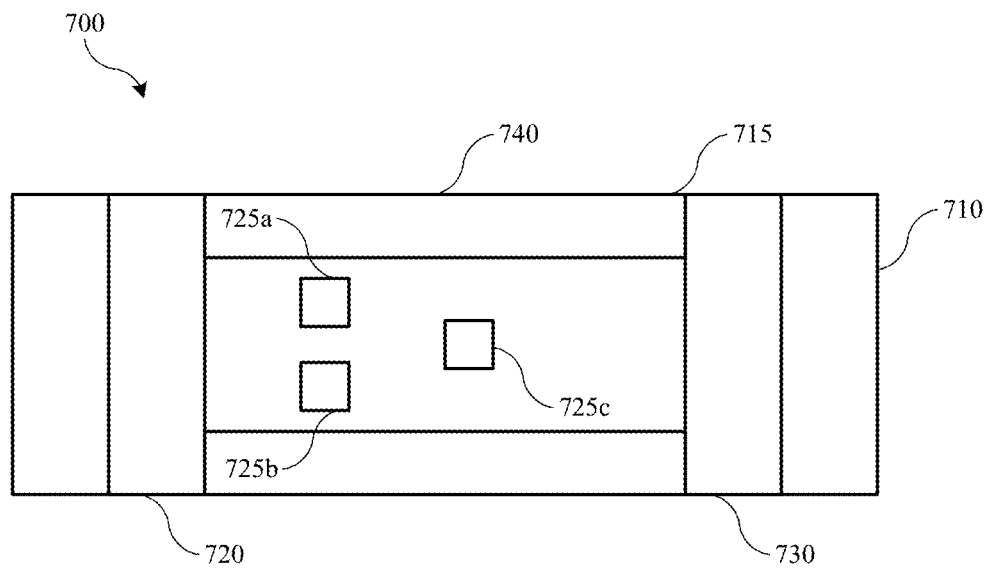
FIG. 7 shows a schematic top plan view of an electrolyte dispensing system according to embodiments of the present technology.

FIG. 7 shows a schematic top plan view of an electrolyte dispensing system 700 according to embodiments of the present technology. System 700 may be a top view of a portion of any of the previously described systems, or may illustrate a variation that may be incorporated with any of the previous systems. System 700 as illustrated includes a housing 715 through which a substrate 710 may be delivered. System 700 includes an inlet roller 720 and an outlet roller 730 as previously described. System 700 also includes delivery devices 725. Delivery devices 725 may be or include any of the previously described delivery devices that may be used to provide an electrolyte to a substrate delivered through the system. Delivery devices 725 may be distributed in any of a variety of configurations relative to substrate 710, and systems according to embodiments of the present technology may include any number of delivery devices to provide the amount of electrolyte predetermined for cells produced. System 700 may also include edge sealing devices 740, which may include a series of rollers as well as a belt or tread system previously described. Edge sealing devices 740 may protect exterior regions from excess electrolyte coverage.

As illustrated, delivery devices 725 may be positioned to deliver electrolyte along a central portion of substrate 710. Depending on the delivery device utilized, multiple devices may be required to accommodate the lateral dimensions of substrates, which may be greater than one meter in some embodiments. For example, delivery device 725a and delivery device 725b may be positioned laterally proximate to one another to provide electrolyte at two lateral locations across a substrate traveling through housing 715. Any number of additional delivery devices may also be included depending on the surface coverage available for any particular delivery device as well the lateral distance to be covered for a substrate. Additional delivery devices may be included along system 700, such as delivery device 725c, which may provide additional electrolyte to substrate 710. Including additional downstream delivery devices may afford time for an initial electrolyte to begin distribution through one or more materials on substrate 710 prior to delivering additional electrolyte. When all electrolyte is delivered from a single device, depending on characteristics of the electrolyte, the electrolyte may not maintain a desired pattern of coating depending on a top-level thickness of electrolyte as well as flow characteristics. FIG. 7 is included as an illustrative example of possible locations and distributions of electrolyte delivery devices. It is to be understood that the particular configuration shown is not intended to limit the described technology, but merely explain how any number of configurations and distributions may be accomplished according to embodiments of the present technology.

Figure 8:
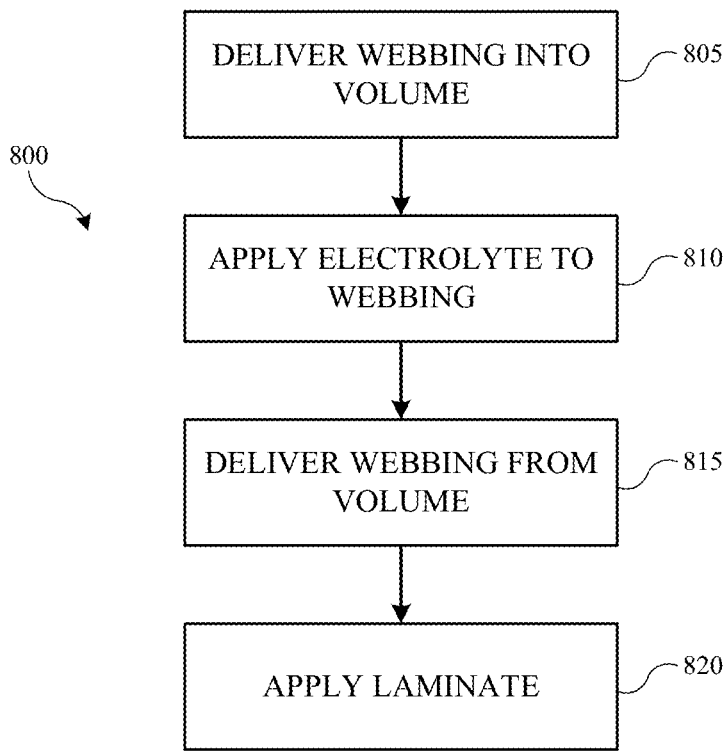
FIG. 8 shows exemplary operations in a method of applying electrolyte to a substrate according to embodiments of the present technology.

FIG. 8 shows exemplary operations in a method 800 of applying electrolyte to a substrate according to embodiments of the present technology. Method 800 may be performed in any of the systems described throughout the present technology, including single stage systems and multistage systems. Method 800 may include delivering a battery cell webbing into an internal volume of a housing positioned along a roller assembly at operation 805. At operation 810, the method may include applying an electrolyte to the battery cell webbing. The electrolyte may be applied within the interior volume of the housing. As previously noted, electrolyte applied may include one or more volatile components that may evaporate at standard environmental conditions. In some embodiments, the housing may be substantially sealed from an exterior environment as previously described, including by utilizing inlet and outlet rollers that may be characterized by a compliant roller facilitating development of a seal for the housing when it receives the battery cell webbing. By sealing the environment, a relatively or substantially closed system may be developed to produce an electrolyte vapor pressure of the volatile components. By establishing a vapor pressure within the housing, the rate of evaporation from the electrolyte may be balanced with a rate of incorporation from the atmosphere developed within the housing. This may allow delivered electrolytes to maintain or substantially maintain their composition during application.

At operation 815, the battery cell webbing may be delivered from the internal volume of the housing. As the battery cell webbing is delivered, or shortly downstream from an exit to the housing, a laminate may be applied to the battery cell webbing at operation 820. By applying the laminate as the battery cell webbing exits the controlled environment of the internal volume of the housing, evaporation of electrolyte material may be limited or prevented when the webbing is exposed to environmental conditions outside of the housing. By utilizing the present technology, large or larger scale battery cells may have electrolytes applied using electrolytes having volatile components. By applying the electrolyte along a surface of the cell, the penetration depth of electrolyte may be less than 1 mm, less than 100 microns, or less, compared to lateral diffusion that may include distances of one meter or more. Additionally, by utilizing a housing that provides a controlled environment along the formation line, the present technology can utilize any known electrolytes without risk of compromising the salt/solvent balance, or by requiring additional cell components or binders to maintain the electrolyte.

In the preceding description, for the purposes of explanation, numerous details have been set forth in order to provide an understanding of various embodiments of the present technology. It will be apparent to one skilled in the art, however, that certain embodiments may be practiced without some of these details, or with additional details.

Having disclosed several embodiments, it will be recognized by those of skill in the art that various modifications, alternative constructions, and equivalents may be used without departing from the spirit of the embodiments. Additionally, a number of well-known processes and elements have not been described in order to avoid unnecessarily obscuring the present technology. Accordingly, the above description should not be taken as limiting the scope of the technology.

Where a range of values is provided, it is understood that each intervening value, to the smallest fraction of the unit of the lower limit, unless the context clearly dictates otherwise, between the upper and lower limits of that range is also specifically disclosed. Any narrower range between any stated values or unstated intervening values in a stated range and any other stated or intervening value in that stated range is encompassed. The upper and lower limits of those smaller ranges may independently be included or excluded in the range, and each range where either, neither, or both limits are included in the smaller ranges is also encompassed within the technology, subject to any specifically excluded limit in the stated range. Where the stated range includes one or both of the limits, ranges excluding either or both of those included limits are also included. Where multiple values are provided in a list, any range encompassing or based on any of those values is similarly specifically disclosed.

As used herein and in the appended claims, the singular forms "a", "an", and "the" include plural references unless the context clearly dictates otherwise. Thus, for example, reference to "a material" includes a plurality of such materials, and reference to "the cell" includes reference to one or more cells and equivalents thereof known to those skilled in the art, and so forth.

Also, the words "comprise(s)", "comprising", "contain(s)", "containing", "include(s)", and "including", when used in this specification and in the following claims, are intended to specify the presence of stated features, integers, components, or operations, but they do not preclude the presence or addition of one or more other features, integers, components, operations, acts, or groups.

What is claimed is:

1. An electrolyte dispensing system comprising:
a housing defining an internal volume, wherein the housing defines an inlet and an outlet;
an inlet roller positioned proximate the housing inlet, wherein the inlet roller is configured to provide a substantial seal at the housing inlet when a substrate is delivered into the housing;
a delivery device positioned between the housing inlet and housing outlet, wherein the delivery device is configured to supply an electrolyte to the substrate delivered into the housing; and
an outlet roller positioned proximate the housing outlet, wherein the outlet roller is configured to provide a substantial seal at the housing outlet when the substrate is delivered from the housing.

2. The electrolyte dispensing system of claim 1, wherein the outlet roller is configured to provide a laminate material to the substrate as the substrate is delivered from the housing.

3. The electrolyte dispensing system of claim 1, wherein the delivery device is contained within the internal volume of the housing.

4. The electrolyte dispensing system of claim 1, wherein the housing defines an aperture in an upper surface of the housing, and wherein the delivery device extends through the aperture.

5. The electrolyte dispensing system of claim 1, wherein the housing comprises sidewalls and a base extending about the substrate delivered through the housing.

6. The electrolyte dispensing system of claim 5, wherein the internal volume defined by the housing is formed to establish an electrolyte vapor pressure within the internal volume during operation.

7. The electrolyte dispensing system of claim 1, further comprising at least two internal rollers positioned within the housing between the inlet and the outlet, wherein the internal rollers are configured to form seals along a lateral edge of the substrate delivered through the housing.

8. The electrolyte dispensing system of claim 7, wherein a tread extends across the internal rollers, and wherein the tread is configured to seal the lateral edge of the substrate delivered through the housing.

9. The electrolyte dispensing system of claim 8, wherein the tread includes a masking bar extending normal to the tread.

10. The electrolyte dispensing system of claim 1, wherein the delivery device comprises a set of delivery devices to provide a multi-step application of electrolyte to the substrate delivered through the housing.

11. An electrolyte dispensing system comprising:
a housing defining an internal volume, wherein the housing defines an inlet and an outlet;

an inlet roller positioned proximate the housing inlet, wherein the inlet roller is configured to provide a substantial seal at the housing inlet when a substrate is delivered into the housing;

a first delivery device positioned between the housing inlet and housing outlet, wherein the first delivery device is configured to supply an electrolyte to the substrate delivered into the housing;

an internal roller positioned within the housing between the first delivery device and the housing outlet, wherein the internal roller is configured to apply a separator to the substrate, and wherein the housing defines an aperture proximate the internal roller for receiving the separator; and an outlet roller positioned proximate the housing outlet, wherein the outlet roller is configured to provide a substantial seal at the housing outlet when the substrate is delivered from the housing.

12. The electrolyte dispensing system of claim 11, further comprising a second delivery device positioned between the internal roller and the housing outlet, wherein the second delivery device is configured to supply additional electrolyte to the substrate delivered into the housing.

13. The electrolyte dispensing system of claim 11, wherein the outlet roller is configured to provide a laminate material to the substrate as the substrate is delivered from the housing.

14. The electrolyte dispensing system of claim 11, wherein the first delivery device is contained within the internal volume of the housing.

15. The electrolyte dispensing system of claim 11, wherein the housing defines an aperture in an upper surface of the housing, and wherein the first delivery device extends through the aperture.

16. The electrolyte dispensing system of claim 11, wherein the internal volume defined by the housing is formed to establish an electrolyte vapor pressure within the internal volume during operation.

17. The electrolyte dispensing system of claim 11, further comprising at least two sealing rollers positioned within the housing between the inlet and the outlet, wherein the sealing rollers are configured to form seals along a lateral edge of the substrate delivered through the housing.

18. The electrolyte dispensing system of claim 11, wherein the first delivery device comprises an inkjet distributor positioned within the housing to deliver electrolyte towards a central portion of the substrate.

19. An electrolyte dispensing system comprising:

a housing defining an internal volume, wherein the housing defines an inlet and an outlet;

a first delivery device positioned between the housing inlet and housing outlet, wherein the first delivery device is configured to supply an electrolyte to the substrate delivered into the housing; and an internal roller positioned within the housing between the first delivery device and the housing outlet, wherein the internal roller is configured to apply a separator to the substrate, and wherein the housing defines an aperture proximate the internal roller for receiving the separator.

20. The electrolyte dispensing system of claim 11, further comprising a second delivery device positioned between the internal roller and the housing outlet, wherein the second delivery device is configured to supply additional electrolyte to the substrate delivered into the housing.

* * * * *